US010628439B1

(12) United States Patent
Bertz et al.

(10) Patent No.: US 10,628,439 B1
(45) Date of Patent: Apr. 21, 2020

(54) SYSTEM AND METHOD FOR MOVIE DIGITAL CONTENT VERSION CONTROL ACCESS DURING FILE DELIVERY AND PLAYBACK

(71) Applicant: Sprint Communications Company L.P., Overland Park, KS (US)

(72) Inventors: Lyle T. Bertz, Lee's Summit, MO (US); Trevor D. Shipley, Olathe, KS (US); Craig A. Sparks, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 446 days.

(21) Appl. No.: 14/704,797

(22) Filed: May 5, 2015

(51) Int. Cl.
*H04L 29/08* (2006.01)
*G06F 16/25* (2019.01)
*G06F 16/28* (2019.01)

(52) U.S. Cl.
CPC .......... *G06F 16/254* (2019.01); *G06F 16/282* (2019.01); *H04L 67/10* (2013.01)

(58) Field of Classification Search
USPC ....................................................... 707/602
See application file for complete search history.

(56) References Cited

U.S. PATENT DOCUMENTS

| 9,049,494 | B2* | 6/2015 | Dhruv ................ H04N 21/6543 |
| 9,681,088 | B1 | 6/2017 | Bertz et al. |
| 9,794,618 | B2* | 10/2017 | Pearson ........... H04N 21/43615 |
| 2004/0073925 | A1* | 4/2004 | Kinoshita ........... H04N 7/17318 725/46 |
| 2010/0179987 | A1* | 7/2010 | Sebastian ............ H04L 12/1859 709/203 |
| 2010/0312596 | A1* | 12/2010 | Saffari ............... G06Q 30/0203 705/7.32 |
| 2011/0282844 | A1* | 11/2011 | Bates .................... G06F 19/321 707/661 |
| 2012/0046770 | A1* | 2/2012 | Becker ................ H04L 65/4084 700/94 |

(Continued)

OTHER PUBLICATIONS

FAIPP Pre-Interview Communication dated Jul. 7, 2016, U.S. Appl. No. 14/704,795, filed May 5, 2015.

(Continued)

*Primary Examiner* — Tamara T Kyle
*Assistant Examiner* — Raheem Hoffler

(57) ABSTRACT

A processing server is disclosed. The server comprises a processor, a memory, and an application stored in the memory. The application when executed by the processor formats data into a data container, wherein the data is comprised of audio and video content of a movie. The application then writes metadata in to the data container, wherein the metadata identifies what processing has been done on the data and identifies algorithms that are applied to the data, and identifies a source location from which the data container is obtained, and identifies a plurality of different data containers with different versions of the audio or video content that have different processing or algorithms applied to them and the source locations from which the different data containers are obtained. The application then stores the data container in a data store, whereby the data container is sourced to playback devices.

17 Claims, 4 Drawing Sheets

(56) References Cited

U.S. PATENT DOCUMENTS

| | | | |
|---|---|---|---|
| 2012/0263241 A1* | 10/2012 | Swenson | H04N 19/172 |
| | | | 375/240.26 |
| 2013/0198005 A1* | 8/2013 | Xiong | G06Q 30/02 |
| | | | 705/14.66 |
| 2014/0119581 A1 | 5/2014 | Tsingos et al. | |
| 2015/0286716 A1* | 10/2015 | Snibbe | G06F 17/30026 |
| | | | 707/610 |
| 2016/0080685 A1 | 3/2016 | De Saint Salvy et al. | |
| 2018/0095718 A1* | 4/2018 | Riedmiller | H03G 9/005 |

OTHER PUBLICATIONS

FAIPP Office Action dated Oct. 17, 2016, U.S. Appl. No. 14/704,795, filed May 5, 2015.

Bertz, Lyle T, et al., "System and Methods for Movie Digital Container Augmented with Post-Processing Metadata", U.S. Appl. No. 14/704,795, filed May 5, 2015.

Notice of Allowance dated Feb. 10, 2017, U.S. Appl. No. 14/704,795, filed May 5, 2015.

\* cited by examiner

SYSTEM AND METHOD FOR MOVIE DIGITAL CONTENT VERSION CONTROL ACCESS DURING FILE DELIVERY AND PLAYBACK

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern movies are not generally sourced on film, but are files comprised of sequences of digital images and audio recordings. These digital images and audio recordings may have post-processing and filters applied to them. For example, the audio recordings may be formatted to play in a movie theater that may have 12 speakers. In another example, the digital images may be formatted to play in a 3 dimensional (3D) format. Movie theaters play these digital images and audio recordings as a movie at their theaters.

SUMMARY

In an embodiment, a processing server that builds metadata is disclosed. The processing server comprises a processor, a memory, and an application stored in the memory. The application when executed by the processor formats data into a data container, wherein the data is comprised of audio and video content of a movie. The application builds metadata, wherein the metadata details what post-processing has been done on the data, wherein the metadata identifies what processing and algorithms are applied to the data and supports selection of data by a playback device, and identifies a source location from which the data container is obtained, and identifies a plurality of different data containers with different versions of the audio or video content that have different processing or algorithms applied to them and the source location from which the different data containers are obtained The application then writes the metadata into the data container. The application then stores the data container in a data store, whereby the data container is sourced to playback devices.

In an embodiment, a method of building metadata by a processing server is disclosed. The method comprises building data into a data container by the processing server, wherein the data comprises audio and video content of a movie. The method further comprises the processing server building metadata, wherein the metadata identifies what processing has been done on the data, identifies algorithms that are applied to the data, and identifies a source location from which the data container is obtained, and identifies a plurality of different data containers with different versions of the audio or video content that have different processing or algorithms applied to them and the source locations from which the different data containers are obtained. The method further comprises writing metadata into the data container by the processing server. The method further comprises storing the data container in a data store by the processing server, whereby the data container is sourced to playback devices.

In an embodiment, a method of retrieving data using metadata is disclosed. The method comprises reading contents of a data container by a playback device, the data container is comprised of data and metadata, and the data is associated with audio and video content of a movie, wherein the metadata identifies processing that has been done to the data and a source location of the data from which the data container is obtained, and identifies a plurality of different data containers with different versions of the audio or video content that have different processing or algorithms applied to them and the source locations from which the different data containers are obtained. The method further comprises identifying that the data container does not contain the correct audio or video content to play by the playback device. The method further comprises sending a request for the correct audio or video content by the playback device using a source location found in the metadata, wherein the request includes credentials that allow the playback device to receive the correct audio or video content. The method further comprises receiving the correct audio or video content by the playback device. The method further comprises playing the correct audio or video content by the playback device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
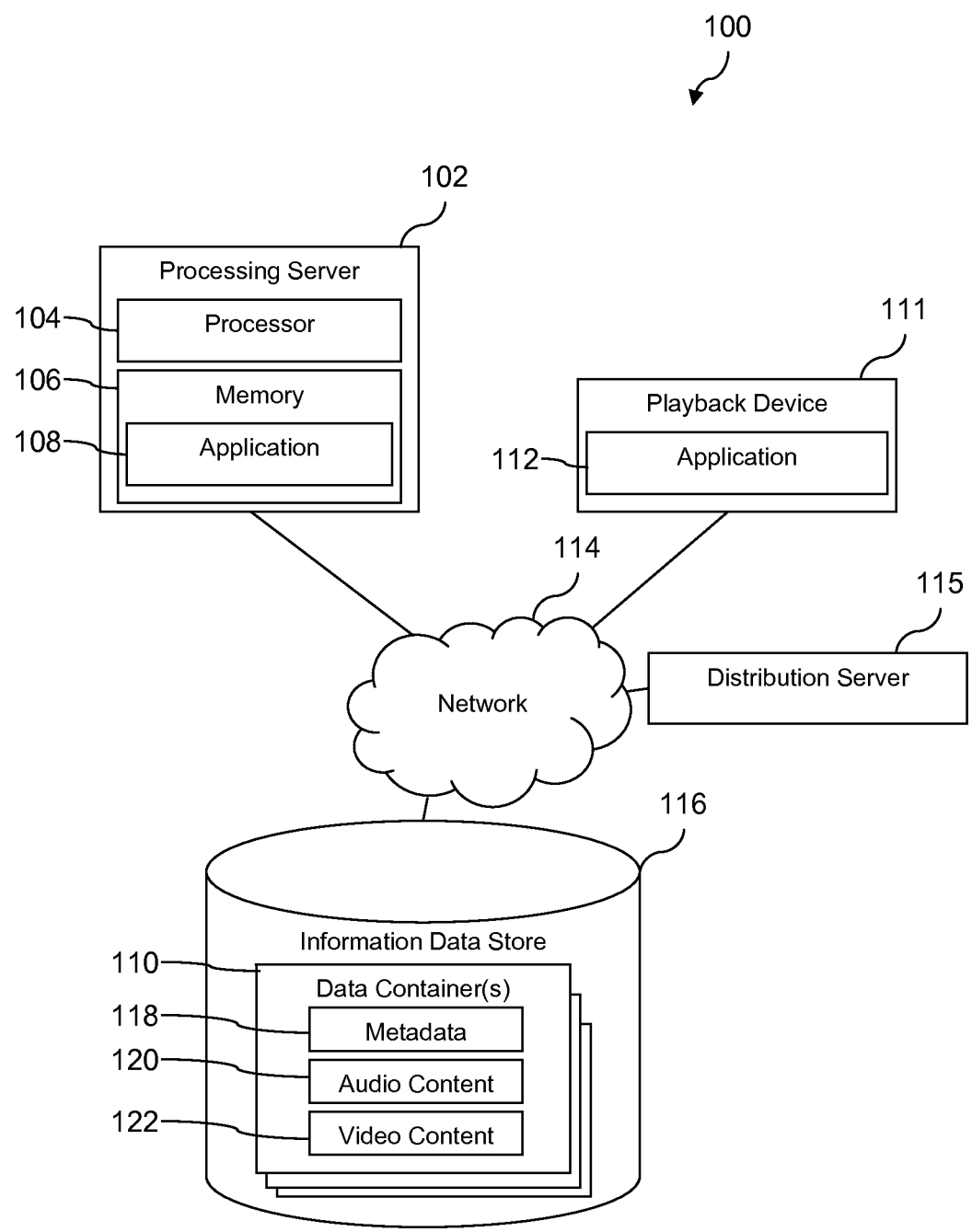
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure provides a system and methods for writing metadata associated with post-processing and filter information and a source location of content to a movie container or data container. The metadata identifies what post-processing has been performed on the data in the data container and identifies a source location where the data container may be retrieved from. In addition to identifying the source location where the data container may be retrieved, the metadata may identify a plurality of other versions of the same movie (e.g., other data containers comprising audio and video content may have been modified and/or post-processed differently, for example for playback in different audio and/or video systems) and source locations of those other versions of the same movie. The metadata may identify the relationships among the plurality of different versions, for example, in a kind of family tree of versions or as a hierarchy. The members of the hierarchy or "family tree" are associated by derivation, directly or indirectly, from the same master version of the audio or video content. The metadata also identifies the location or locations where the data containers of the other versions of the mobile may be accessed (possibly contingent on authentication and/or authorization).

The metadata may also identify processing information and identify algorithms that are applied to the data, e.g., audio processing applied to the audio content. Recipients of these data containers may be able to determine from the metadata if they should apply any more post-processing or filters to the audio and video content they play or if they should avoid doing so and retrieve a new copy of the audio and video content by using the source location that is detailed in the metadata.

Audio and video content of movies sometimes have post-processing and filters applied to them before they are sent out by media and entertainment companies to movie theaters. In the current system, movie theaters that receive these files may be unable to determine what post-processing or filters have already been applied to the files. The post-processing and filters may optimize the audio content to play for a movie theater that utilizes audio processing for their theater or may apply three dimensional (3D) effects to the video content. Without knowing what post-processing and filtering that may have been performed, movie theaters may apply additional post-processing and filters of their own. If the audio and video content have post-processing and filters already applied to them, and movie theaters apply their own post-processing and filters to the audio and video content, the movie theaters may display less than optimal audio or video. In an embodiment, irreparable degradation may be done to the audio and video content that result in the content being unplayable in the movie theater as a result of overlap of post-processing and filters. If this happens, movie theaters may have to ask the media and entertainment companies that they receive the movies from for new copies of the audio and video content that were degraded.

In an embodiment, an application executing on a processing server formats data into a data container. The data container is comprised of audio and video content of a movie. The application builds metadata that is associated with the data in the data container. The metadata details what post-processing has been done on the data. The metadata also identifies what processing and algorithms are applied to the data. The metadata also supports the selection of data by a playback device. The playback device may be any device one of a desktop computer, a laptop computer, or another computer. In an embodiment the playback device is located at a movie theater. The application also writes metadata into the data container. The processing server or a distribution server transmits the data container to a playback device, e.g., a playback system in a movie theater. The playback device reads the metadata in the data container and with the metadata is able to identify what processing has been applied to the data before applying any post-processing or filters of its own. In an embodiment, the processing server may not transmit the data containers. The data containers may be stored to a separate information data store. The distribution server may access the information data store and transmit the data containers containing the data and metadata to the playback devices.

The playback devices may determine that it received the wrong data by reading the metadata and identifying what post-processing has been applied to the data, e.g., the received audio content may be optimized to play through a 10 speaker system and the movie theater where the playback device is located may have 15 speakers. In order to get the correct audio content the playback device may read the metadata and identify a source location of the correct audio content. The source location may reference a file in the information data store or another location where the playback device may retrieve or receive the correct data. The source location may reference a part or a node of a hierarchical family tree of separate versions of the audio and video content. The versions may be modified and post-processed from master versions of the audio and video content, i.e., audio content processed to play in a 12 speaker theater versus audio content processed to play in a 15 speaker theater or video content processed to play in a 3 dimensional (3D) format versus a high definition format, and other examples. The tree of source locations or versions of the audio and video content has identifies data containers with many versions of the audio and video content from which different versions of audio and video content may be identified. To access the data, the playback device may use given access rights, a key, a passcode, or other credentials to pass a security challenge designed to protect the data. The credentials used to pass the security challenge may be given by the media or entertainment company that produced the movie. The playback device may also send a request to the distribution server that details the data that the playback device is looking for. The request may comprise the access rights used to pass the security challenge. Using the access rights, the distribution server may pass the security challenge and retrieve and transmit the requested data. The playback device or the distribution server may retrieve an entire data container with the correct audio and video content or, alternatively, select the exact content it desires. Selection may be used because the size of the files of content may vary and network bandwidth may be conserved by not downloading a large volume of data that the playback device or distribution server already has on hand. For example, audio content may be comprised of less data than video content. If the playback device or the distribution server does not want to download the video content, it may conserve network bandwidth by only downloading the desired version of audio content, thereby avoiding downloading the much greater volume of video data that it already has on hand.

In an embodiment, the metadata may also list which additional post-processing may be useful for the audio or video content in the data container. For example, the data in the data container may be optimized to play in a 12 speaker theater based on the audio content, and may also be optimized to play in a three-dimensional (3D) format based on the video content. The audio content could be optimized by the playback device at a movie theater. The metadata can identify beneficial post-processing and movie theaters via the playback device may evaluate the metadata and apply additional post-processing based on the metadata. The metadata may also list which additional post-processing may be beneficial based on the type of playback device that receive the data container, the environment that the data will be used in, e.g., a 12 speaker surround sound movie theater, in addition to listing the post-processing that has already been done to the data in the data container.

The processing server application allows movie theaters to receive a data container that is comprised of data and metadata. With the metadata that identifies what post-processing and filters have been applied to the audio and video content and a source location where audio and video content may be received. Movie theaters may be able to determine if any further post-processing or filters may be applied to the audio and video content and may retrieve the correct content when they receive incorrect content. Because of the metadata, movie theaters may be able to avoid applying extra post-processing and filters that damage the content or cause degraded quality of the content, and may retrieve the correct content that they may use if they receive incorrect content. U.S. patent application Ser. No. 14/704,795 filed, May 5, 2015, entitled "System and Methods for Movie Digital Container Augmented with Post-Processing Metadata," by Lyle T. Bertz, et al., is incorporated by reference herein in its entirety.

Turning now to FIG. 1, a system 100 is described. The system 100 comprises a processing server 102, a playback device 111, a distribution server 115, an information data store 116, and a network 114. The processing server 102 further comprises a processor 104, a memory 106, and an application 108 stored in the memory 106. The playback device 111 further comprises a playback application 112. The information data store 116 further comprises a plurality of data containers 110. The plurality of data containers 110 comprises metadata 118, audio content 120, and video content 122.

In an embodiment, the processing server 102 formats data and writes metadata 118 that is stored to the plurality of data containers 110 to the information data store 116 for storage. The data that is formatted is associated with audio and video content 120/122 of a movie. The metadata 118 identifies and details, in part, what post-processing, filters, and algorithms are applied to the data. Post-processing and filters may be in reference to features that optimize the audio and video content 120/122 to be played as a movie in movie theaters by the playback device 111. For example, the audio content 120 may be processed so that it plays in a surround sound format that matches the theater it is playing in. The audio content 120 may be optimized to play through 5 speakers, 10 speakers, 15 speakers, or another number of speakers in a surround sound format. In another example, the video content 122 may be processed so that it may play in a 3 dimensional (3D) visual format.

In an embodiment, the processing server 102 may write metadata 118 so that the playback device 111 is able to identify what post-processing and filters have been applied to the audio and video content 120/122. If the playback device 111 is unable to determine what post-processing and/or filters have been applied to the audio and video content 120/122, the playback device 111 may apply post-processing and filters of its own to the data and cause degradation of quality to the audio and video content 120/122 because of post-processing and/or filter overlap. The metadata 118 may also comprise information about the hierarchical family tree which is comprised of all of the versions of the audio and video content 120/122. The versions may be modified and post-processed from master versions of the audio and video content, i.e., audio content 120 processed to play in a 12 speaker theater versus audio content 120 processed to play in a 15 speaker theater or video content 122 processed to play in a 3 dimensional (3D) format versus a high definition format, and other examples.

The application 108 may execute on the processor 104. The playback device 111 may be a desktop computer, a laptop computer, or another computer.

In an embodiment, the playback device 111 via the playback application 112 sends requests to and receives data containers 110 from the distribution server 115. The playback device 111 may be a desktop computer, a laptop computer, or another computer. The playback device 111 may be located at a movie theater, or other places that play movies. The playback device 111 may also apply post-processing and/or filters to the audio and video content 120/122 based on the set-up of the movie theater that the playback device 111 may be located in. For example, the movie theater that the playback device 111 may be located in may have 10 speakers spread out throughout a single theater room and the playback device 111 may format the audio content 120 in the data container 110 so that it plays audio through those 10 speakers.

The distribution server 115 may receive data containers 110 from the processing server 102, receive requests for data containers 110, retrieve the data containers 110 from the information data store 116, and transmit the requested data containers 110 to the playback device 111. The information data store 116 may be comprised of data containers 110 and may allow the distribution server 115 to retrieve the data containers 110 to transmit to the playback device 111. The information data store 116 may also allow the playback device 111 to retrieve data containers 110. The playback device 111 or the distribution server 115 may retrieve data containers 110 by using access rights, a special token, key, password, or other security check to access the information data store 116 and retrieve the correct audio or video content 120/122. In an embodiment, a movie theater may have a plurality of playback devices 111 that may be communicatively coupled to a distribution server or other devices that may retrieve and distribute requested versions of audio and video content 120/122 for the plurality of playback devices 111 or a single playback device 111. The network 114 may be a private communication network, a public communication network, or a combination thereof. While one processing server 102, one playback device 111, one distribution server 115, and one information data store 116 are illustrated in FIG. 1, it should be understood that there may be any number of processing servers 102, playback devices 111, distribution servers 115, and information data stores 116.

In an embodiment, the application 108 is executed by the processor 104 of the processing server 102 and formats data into one of a plurality of data containers 110. The data that the processing server 102 is formatting are audio and video content 120/122 that are associated with a movie. The processing server 102 may begin the formatting process when it receives data that is marked and ready for formatting. This data may come from entertainment or media companies that produce movies. The processing server 102 builds and writes metadata 118 into the data container 110, wherein the metadata 118 identifies what post-processing and algorithms are applied to the data and supports selection of data by the playback device 111. The metadata 118 also identifies a source location from which the data container 110 may be obtained and identifies a plurality of different data containers 110 with different versions of the audio content 120 or video content 122 that have different processing or algorithms applied to them. The source location in the metadata 118 may be a part of a hierarchical family tree that may comprise multiple versions of the audio and video content 120/122 that may be chosen from so that playback device is able to play the suitable audio and video content 120/122. The metadata 118 may be written by the processing server 102 as a header or footer of the data container 110, stored to a file located in the data container 110, or in another format by which the playback device 111 is able to locate and read the metadata 118 in the data container 110. The processing server 102 may transmit the data containers 110 to the information data store 116 for storage where the distribution server 115 may retrieve and transmit the data containers 110 to the playback device 111.

In an embodiment, the playback device 111 may retrieve the data container 110 itself as opposed to receiving the data container 110 from the distribution server 115. The playback device 111 may read the contents of the data container 110 and determine the data in the data container 110 is not the correct data. For example, the playback device 111 may determine that the audio content 120 has already been processed and optimized to play through a 10 speaker movie theater, but the movie theater where the playback device 111 is located may have 15 speakers. If the playback device 111 plays the movie that is optimized to play through 10 speakers in a theater that has 15 speakers, the sound may not seem as full as it could or may even seem degraded in quality. To retrieve the correct audio or video content 120/122, the playback device 111 via the playback application 112 may read the metadata 118 to find a source location of where the data container 110 that comprises the correct audio or video content 120/122 may be found. In an embodiment, there may be other devices that may retrieve and distribute the audio or video content 120/122 to the playback device 111. For example, there may be a distribution server that is communicatively coupled to the playback device 111. The distribution server may receive requests for audio or video content 120/122 from the playback device 111 and retrieve the requested audio or video content 120/122 and transmit the audio or video content to the playback device 111.

The correct audio or video content 120/122 may be located in the information data store 116 in one of the plurality of data containers 110, a file in the information data store 116, or another location using the audio or video content 120/122 source location in the metadata 118. The metadata 118 may be located in a header, footer, dedicated file, or another location of the data container 110 where the playback device 111 may identify and read the metadata 118. Once the playback device 111 looks up the source location, the playback device 111 sends a request for the correct audio or video content 120/122 to the distribution server 115. The request that the playback device 111 sends comprises credentials that show the distribution server 115 that the playback device 111 is allowed to receive the audio or video content 120/122 that it is requesting. The credentials may be access rights, a digital rights certificate, a key code, a passcode, or another means of validating the credentials of the playback device 111. The distribution server 115 may receive the request from the playback device 111, read the credentials of the playback device 111, validate the credentials, and then retrieve the audio or video content 120/122 from the information data store 116.

The playback device 111 may also be able to retrieve the correct audio or video content 120/122 by using the access rights. Instead of going through the distribution server 115, the playback device 111 may access the information data store 116 itself using the access rights to validate itself. The distribution server 115 and the playback device 111 may be able to retrieve the whole data container 110 with the correct audio or video content 120/122 or they may be able to partition out the exact content that they want. With the correct audio and video content 120/122, the playback device 111 plays the movie.

In an embodiment, the playback device 111 may be able to apply additional post-processing to the data in the data container 110 based on the metadata 118. The metadata 118 may also list which additional post-processing may be useful or beneficial for the audio content 120 or video content 122. For example, the data in the data container 110 may be optimized to play in a 12 speaker theater based on the audio content 120 listed by the metadata 118, and may also be optimized to play in a three-dimensional (3D) format based on the video content. The audio content 120 may be further optimized by applying additional post-processing by the playback device 111 at a movie theater. The metadata 118 may identify this and the playback device may be able evaluate the metadata 118 and apply additional post-processing to the audio content 120 based on the metadata 118. The metadata 118 may also list which additional post-processing may be beneficial based on the type of playback device 111 that receives the data container 110, the environment that the data in the data container 110 will be used in, e.g., a 12 speaker surround sound movie theater, in addition to listing the post-processing that has already been done to the data in the data container 110.

Figure 2:
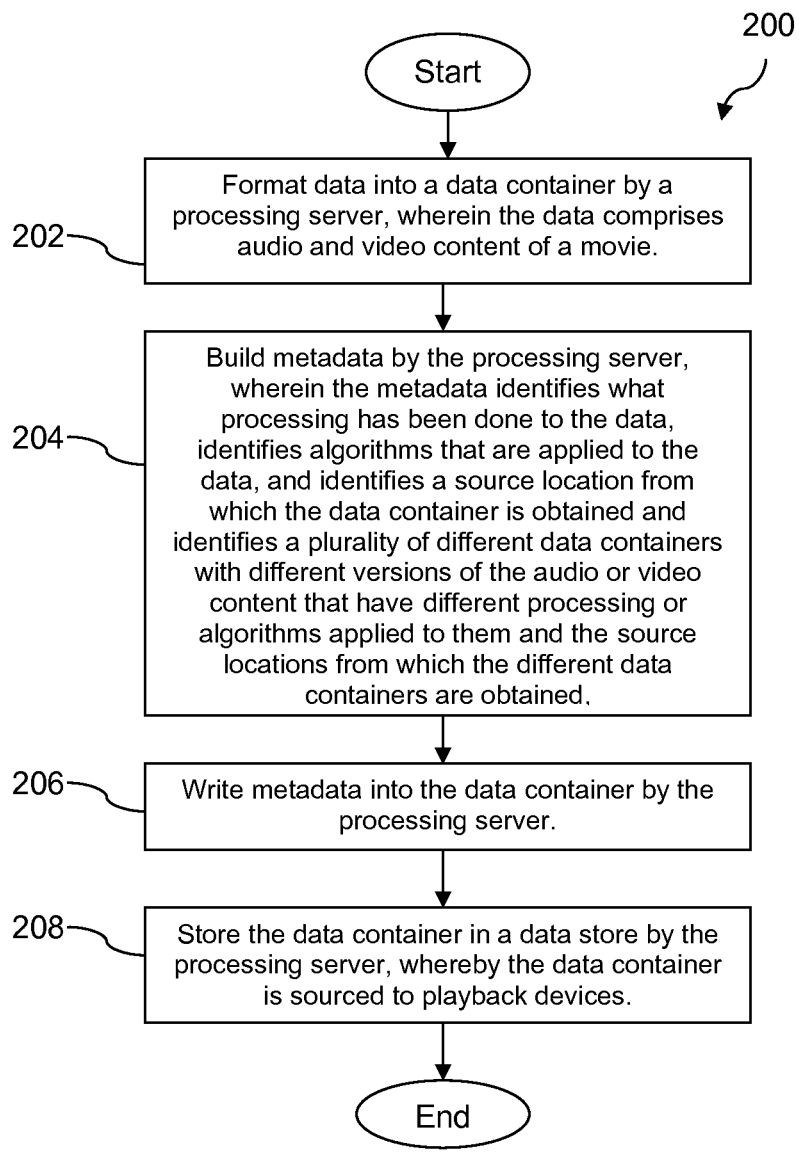
FIG. 2 is a flow chart of a method according to an embodiment of the disclosure.

In FIG. 2, a method 200 is described. At block 202, a processing server formats data into a data container, wherein the data comprises audio and video content of a movie. At block 204, the processing server builds metadata into the data container, wherein the metadata identifies what processing has been done to the data, identifies algorithms that are applied to the data, and identifies a source location from which the data container is obtained, and identifies a plurality of different data containers with different versions of the audio or video content that have different processing or algorithms applied to them and the source locations from which the different data containers are obtained. The source location may be a part of a hierarchical family tree of separate versions of the audio and video content. The versions may be modified and post-processed from master versions of the audio and video content, i.e., audio content processed to play in a 12 speaker theater versus audio content processed to play in a 15 speaker theater or video content processed to play in a 3 dimensional (3D) format versus a high definition format, and other examples. At block 206, the processing server writes the metadata into the data container. At block 208, the processing server stores the data container in a data store, whereby the data container is sourced to playback devices.

Figure 3:
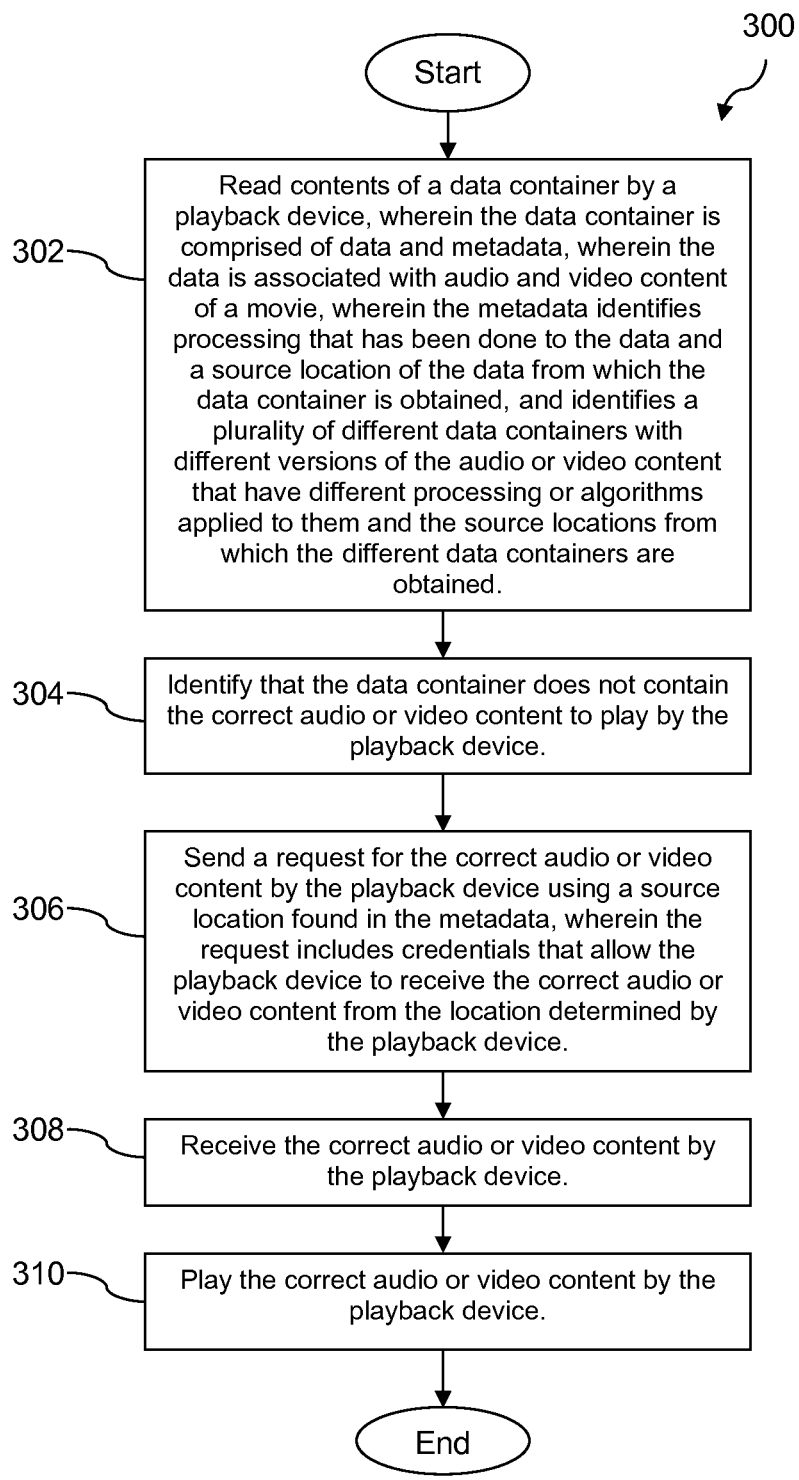
FIG. 3 is a flow chart of another method according to an embodiment of the disclosure.

In FIG. 3, a method 300 is described. At block 302, a playback device reads contents of a data container, wherein the data container is comprised of data and metadata, wherein the data is associated with audio and video content of a movie, wherein the metadata identifies processing that has been done to the data and a source location of the data, and identifies a plurality of different data containers with different versions of the audio or video content that have different processing or algorithms applied to them and the source locations from which the different data containers are obtained. At block 304, the playback device identifies that the data container does not contain the correct audio or video content to play. The playback device may identify that the data container may not have the correct audio or video content by reading the metadata which details the processing that has been done the audio or video content. At block 306, the playback device sends a request for the correct audio or video content using a source location found in the metadata, wherein the request includes credentials that allow the playback device to receive the correct audio or video content. At block 308, the playback device receives the correct audio or video content from the location determined by the playback device. In an embodiment, there may be other devices that may retrieve and distribute the audio or video content to the playback device. For example, there may be a distribution server that is communicatively coupled to the playback device. The distribution server may receive requests for audio or video content from the playback device and retrieve the requested audio or video content and transmit the audio or video content to the playback device. At block 310, the playback device plays the correct audio or video content.

Figure 4:
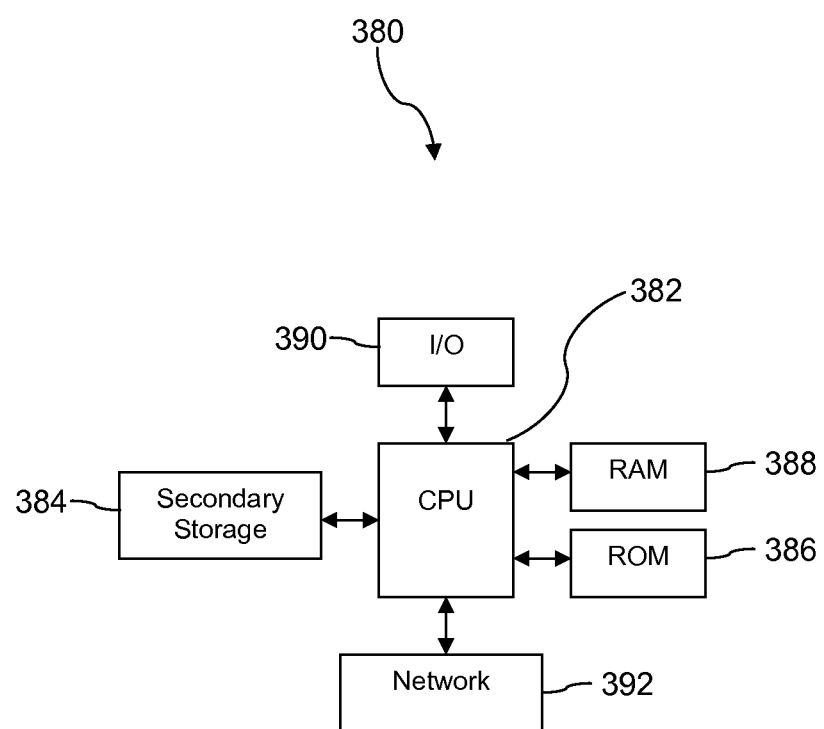
FIG. 4 illustrates an exemplary computer system suitable for implementing the several embodiments of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:
1. A system, comprising:
a data store;
a playback device located at a movie theater;
a processing server that builds metadata, the processing server comprising:
   a processor,
   a memory,
   an application stored in the memory that, when executed by the processor,
      formats data into a data container, wherein the data is comprised of audio and video content of a movie, builds metadata, wherein the metadata details what post-processing has been done on the data, wherein the metadata identifies what processing and algorithms are applied to the data and supports selection of data by the playback device, and identifies a source location from which the data container is obtained, and identifies a plurality of different data containers with different versions of the audio or video content that have different processing or algorithms applied to them and the source location from which the different data containers are obtained, writes the metadata into the data container, and stores the data container in the data store;

the data store is configured to:

receive a request from the playback device for the data container, transmit the data container to the playback device responsive to receiving the request from the playback device for the data container, and transmit one of the plurality of different data containers to the playback device responsive to receiving a request from the playback device for the one of the plurality of different data containers based at least partially on the metadata that identifies the source location from which the different data containers are available; and the playback device is configured to:

generate and transmit the request to the data store for the data container, receive and analyze the data container to determine based on the metadata whether the data formatted into the data container is suitable for playback by the playback device, generate and transmit the request for the one of the plurality of different data containers when the analysis based on the metadata indicates that the data formatted into the data container is not suitable for playback by the playback device, the request for the one of the plurality of different data containers at least comprising a source location for the one of the plurality of different data containers identified from the metadata, wherein the request for the one of the plurality of different data containers is transmitted to the source location for the one of the plurality of different data containers identified from the metadata, and receive the one of the plurality of different data containers from the source location for the one of the plurality of different data containers identified from the metadata.

2. The system of claim 1, wherein the metadata is written as a header or footer of the data container.

3. The system of claim 1, wherein the application transmits the data containers to an information data store, and wherein a distribution server retrieves the data containers from the information data store and transmits the data containers to a playback device.

4. The system of claim 1, wherein the source locations of the data containers are part of a hierarchical family tree that has many data containers with many versions of the audio and video content from which different versions of audio and video content are identified.

5. A method of building metadata by a processing server, comprising:

formatting data into a data container by the processing server, wherein the data comprises audio and video content of a movie;

building metadata by the processing server, wherein the metadata identifies what processing has been done on the data, identifies algorithms that are applied to the data, and identifies a source location from which the data container is obtained, and identifies a plurality of different data containers with different versions of the audio or video content that have different processing or algorithms applied to them and the source locations from which the different data containers are obtained;

writing metadata into the data container by the processing server;

storing the data container in a data store by the processing server;

generating and transmitting, by a playback device located at a movie theater, a request to the data store for the data container;

receiving, by the data store, the request from the playback device for the data container;

transmitting, by the data store, the data container to the playback device responsive to receiving the request from the playback device for the data container;

receiving and analyzing, by the playback device, the data container to determine based on the metadata whether the data formatted into the data container is suitable for playback by the playback device;

generating and transmitting, by the playback device, a request for one of the plurality of different data containers when the analysis based on the metadata indicates that the data formatted into the data container is not suitable for playback by the playback device, the request for the one of the plurality of different data containers at least comprising a source location for the one of the plurality of different data containers identified from the metadata, wherein the request for the one of the plurality of different data containers is transmitted to the source location for the one of the plurality of different data containers identified from the metadata;

transmitting, by the data store, the one of the plurality of different data containers to the playback device responsive to receiving the request from the playback device for the one of the plurality of different data containers based at least partially on the metadata that identifies the source location from which the different data containers are available, wherein the data store is the source location for the one of the plurality of different data containers identified from the metadata; and receiving, by the playback device, the one of the plurality of different data containers from the source location for the one of the plurality of different data containers identified from the metadata.

6. The method of claim 5, wherein the metadata is written as a header or footer of the data container.

7. The method of claim 5, wherein the playback device is one of a desktop computer, or a laptop computer.

8. The method of claim 5, wherein the processing server and the playback device are communicatively coupled via a communication network.

9. The method of claim 8, wherein the communication network is a private communication network or a public communication network.

10. The method of claim 5, wherein there is an information data store that the processing server transmits the data containers to for storage.

11. A method of retrieving data using metadata, comprising:
- reading contents of a data container by a playback device located at a movie theater, wherein the data container is comprised of data and metadata, where the data includes audio and video content of a movie and the metadata identifies post-processing and filters that have been applied to the data and a source location of the data from which the data container is obtained and identifies a plurality of different data containers with different versions of the audio or video content that have different post-processing or filters applied to them and the source locations from which the different data containers are obtained;
- identifying that the data container does not contain the correct audio or video content to play by the playback device based at least partially on the metadata identifying the processing that has been done to the data;
- sending a request for the correct audio or video content by the playback device using the source location found in the metadata and based at least partially on the metadata identifying the different data containers with different versions of the audio or video content that have different post-processing or filters applied to them, wherein the request includes credentials authorizing the playback device to receive the correct audio or video content, and wherein the request for the correct audio or video content is transmitted to the source location found in the metadata;
- receiving the correct audio or video content by the playback device from the source location for the one of the plurality of different data containers identified from the metadata; and
- playing the correct audio or video content by the playback device.

12. The method of claim 11, wherein the playback device is one of a desktop computer or a laptop computer.

13. The method of claim 11, wherein the credentials is one of access rights, a passcode, a key, or a pin.

14. The method of claim 11, wherein the audio content is optimized to play in a surround sound format through 5, 10, or 15 speakers.

15. The method of claim 11, wherein post-processing the video content results in optimizing the video content for play in a 3 dimensional (3D) format.

16. The method of claim 11, wherein the playback device accesses the source location itself.

17. The method of claim 16, wherein the playback device retrieves a whole data container or partitions out the exact content.

* * * * *